Jan. 15, 1952  M. BONOTTO  2,582,675
PROCESS AND APPARATUS FOR SOAKING, FILTERING AND SETTLING OF
MISCELLA THROUGH SOLID OIL-BEARING MATERIALS AND
SOLVENT EXTRACTION THEREOF
Filed Aug. 9, 1946
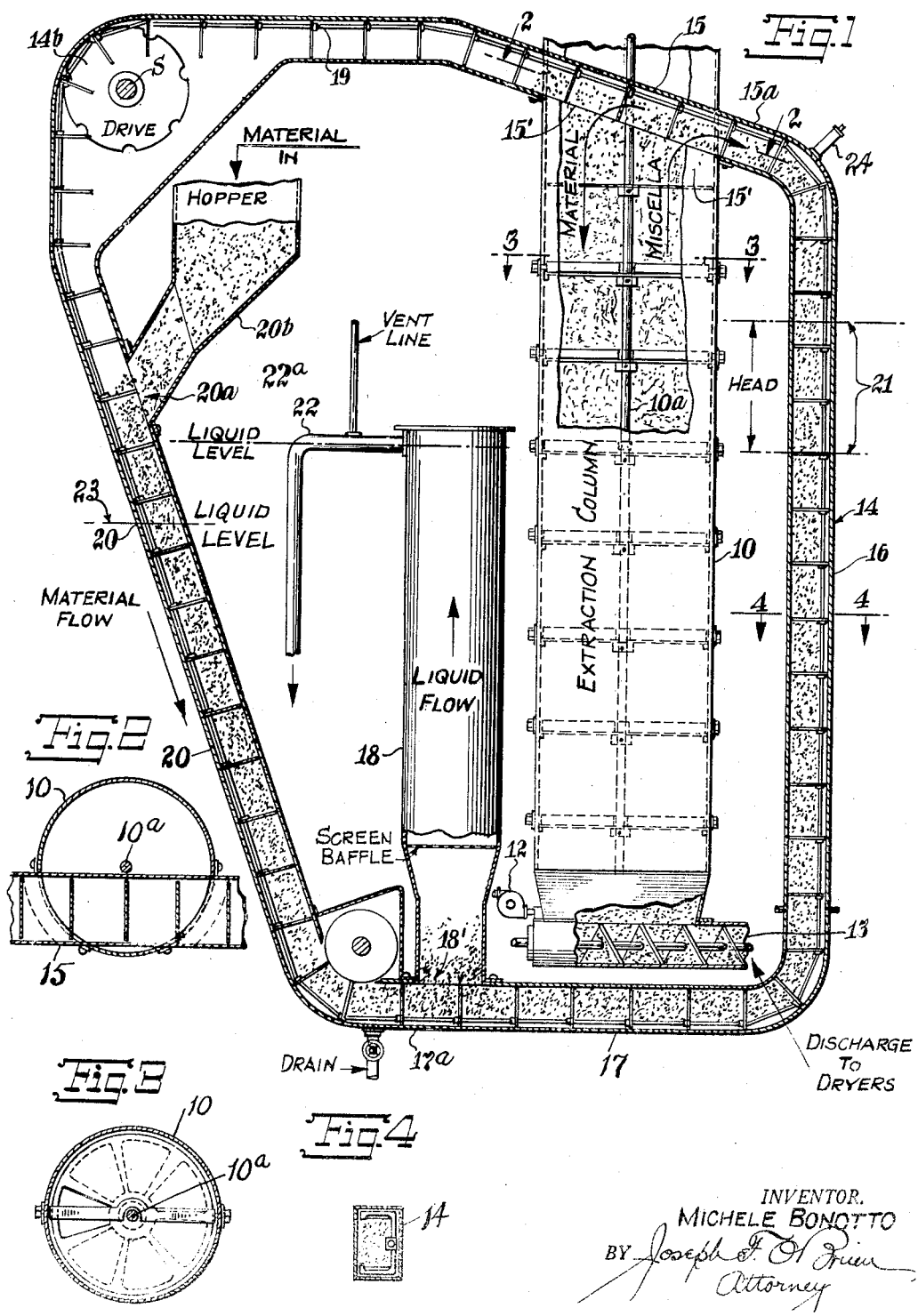
INVENTOR.
MICHELE BONOTTO
BY Joseph F. O'Brien
Attorney

UNITED STATES PATENT OFFICE 2,582,675

PROCESS AND APPARATUS FOR SOAKING, FILTERING, AND SETTLING OF MISCELLA THROUGH SOLID OIL-BEARING MATERIALS AND SOLVENT EXTRACTION THEREOF

Michele Bonotto, Princeton, N. J.

Application August 9, 1946, Serial No. 689,538

4 Claims. (Cl. 260—412.4)

This invention relates to process and apparatus for continuous soaking and/or filtering and settling of miscella through solid oil-bearing materials and solvent extraction thereof.

In solvent-extraction processes a resultant mixture of oil and solvent, which is called miscella, contains foreign particles of solid material composed of particles of the oil-bearing process material. In such extraction of oil with solvent from vegetable seeds or from grains or nuts, the oil-bearing material (seeds or grains) is, in order to permit more ready access of the solvent to the cellular tissue, initially crushed and/or flaked and it has been found in practice that the flaked form of such material offers the most surface to the action of the solvent, but during the flaking operation a certain amount of dust or fines is produced and the flaked material embodying this dust or fines is conventionally fed with the flaked material into the extraction apparatus or column and both flakes and fines are subjected to the extraction process with a solvent. In the subsequent extraction in the extraction column, the mixture of solvent and oil has a tendency to carry away the fines so fed as it leaves the extractors, the amount of fines thus carried away being in proportion to the efficiency of the strainer through which the miscella must pass before leaving the extraction column.

Various forms of filtering apparatus were, in the common practice of the oil extraction industry, employed to remedy this condition in part and settling of the miscella was also employed. Miscella from some oil-bearing materials, depending upon the specific gravity thereof and the fineness of the fines therein, have heretofore required only pre-settling while others have required pre-settling and a final filtering.

In my Patent #2,370,138, dated February 27, 1945, I have fully specified the prior art, and in referring to separate prior art settlings have stated:

"When settling of the miscella is used, difficulty is encountered in handling the solids which constitute the settlings and in recovering the oil and solvent with which the settlings are soaked."

My said patent shows and describes an apparatus and process in which a miscella product of an extraction column is independently fed through a continuous conveyor-conduit and filtered in a filter section in which the initially flaked solids of an extractable given material is utilized to provide a filtering medium for said miscella product, and this flaked material after being loaded or having its interstices loaded with fines of the same material in the filtering section is thereafter independently fed to the extraction column in a conventional manner. In this apparatus and process, said filter section is provided with screened draining or outlet portions having perforations or screens in the walls of the conduit through which the filtered miscella or filtrate passes. While this apparatus is satisfactory for certain types of material, I have found that with certain other types of material the screens become clogged and it is therefore desirable to provide apparatus in which the use of such screened draining outlets are eliminated.

One of the objects of my present invention is to eliminate, in a conveyor-conduit that is employed in a soaking and/or filtering operation, the necessity for screened draining or outlet portions with perforated or walled sections and to procure an improved result by subjecting process material, preferably while being fed into an extractor to a soaking and/or filtering operation with miscella produced in the extraction of similar material, then discharging such miscella through a settling tank having its settling end connected with a portion or section of said conveyor-conduit to subject such miscella to a fines-settling action between its soaking and/or filtering and discharge.

Another object of my invention is to provide in such a conveyor-conduit a filtering section or portion and to subject such miscella to a filtering action through the process material during conveyance thereof, then discharging such miscella through a settling tank having its settling end connected with a portion or section of said conveyor-conduit to subject such miscella to a fines-settling action between its soaking and/or filtering and discharge.

Still another object of my invention is to provide in said conveyor-conduit for an initial soaking of solid process material in liquid miscella and the settling in a moving or conveyed column of such solid process material of fines produced in the operation of preparing such process material.

Another object of my invention is to directly connect a continuous conveyor-conduit of the type hereinabove specified with a counter-current extractor and to provide for a continuous movement through the process material being so conveyed in said conduit of miscella from the extractor in a soaking and/or filtering operation and to discharge such miscella through a settling tank directly connected with a settling section or portion of said conveyor-conduit, to load said process material in its passage through the filter-section or portion of said continuous conveyor-conduit with fines produced in the extractor, and also to load said process material with settled fines also produced in the extractor.

Still another object of my invention is to arrange in said fines-settling section or portion of the conveyor-conduit a settling tank which will at all times enable an efficient and continuous settling and the automatic adding to a conveyed or moving column of process material within said conduit of fines from miscella produced in solvent extractor.

Still another object of this invention is to connect with a solvent extractor a continuous conveyor-conduit as a material-feeding means therefor and as a miscella-filtering mechanism, and to form said parts into an integral and unitary piece of apparatus so arranged that a single continuous conveyor-conduit not only functions to feed process material directly into an extractor but enables miscella from the extractor to flow directly and counter-currently through the material being fed to the extractor.

Another object of my invention is to provide an improved apparatus in which a unitary device or piece of apparatus or equipment of the type specified, including said continuous conveyor-conduit, will embody a fines-settling portion embodying a connected settling tank adapted in handling some materials, to eliminate or avoid settling in separate or independent apparatus of the solid fines, whereby the usual difficulties found in handling fines in such materials are eliminated, and great economy of apparatus is accomplished.

Another object of my invention is to provide in a unitary apparatus of the type specified, a continuous conveyor-conduit of the drag-chain type as an extractor-feed element as well as a continuous miscella conduit having sections for filtering of miscella through process material and for settling miscella and feeding the settled fines to said process material, whereby the conventional screw-actuated feed mechanism for the extractor and the perforated draining sections for the miscella outlet are eliminated.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawings, in which:

Fig. 1 is an illustrative view partly in section and partly in side elevation of a vertically-disposed apparatus embodying my invention and comprising my extraction column and unitarily connected conveyor-conduit;

Fig. 2 is a top plan view of my column and connected portions of my conduit-conveyor;

Fig. 3 is a cross-section through my extraction column on the line 3—3 of Fig. 1 looking in the direction of the arrows; and Fig. 4 is a cross-section through my conveyor-conduit on the line 4—4 of Fig. 1, looking in the direction of the arrows.

In general terms, the process of my present invention consists in treating process-material, preferably while being conveyed to an extractor by subjecting the same to a washing or soaking operation with miscella produced in the extraction process of similar material and fed in counter-current with the conveying movement of said material, settling said miscella in a settling tank having a direct connection with said conveyor-conduit to provide for a settling of fines and a flowing and discharge of material through said settling tank, and the apparatus of my present invention embodies primarily a novel combination of a counter-current solvent extractor with a continuous conveyor-conduit preferably directly connected thereto and functioning both as a conveyor and as a feeding mechanism of process material for the extraction column, which is preferably prepared in flaked form, while simultaneously providing a conduit for directly receiving and conducting miscella in counter-current to cause a filtering of the miscella through the conveyed process material and a loading of said process material with fines; and also includes the provision in combination with such a continuous conveyor-conduit of a settling tank arranged to automatically discharge its settlings to a column of said process material passing through said conduit to provide for an outlet and counter-current flow of the miscella and to produce an additional clarification of the miscella and additional loading of the flaked material with settled fines therefrom.

In the preferred embodiment of my invention, I have also improved the process of counter-current oil extraction by providing for a clarifying of miscella in a continuous operation by first percolation and filtering said miscella through a conveyed or moving column of flaked process material in counter-current therewith to remove filtered fines therefrom, and secondarily by discharging or decanting such filtered miscella through a settling tank to remove settled fines therefrom, and in the same operation automatically introducing thereinto during conveying movement thereof the fines settled out in the settling operation; then loading the said process material with fines in the percolating and filtering operation and lastly feeding said fines-enriched process material to an oil-extraction operation in an extractor. I preferably accomplish these results in a continuous operation by a counter-current filtering movement of the miscella product resulting from an extraction operation in the extractor through solid process material during a conveying and feeding movement thereof to said extractor by a conveyor-conduit, and discharging or decanting the said filtered miscella through a settling tank connected with said conveyor-conduit. I also preferably provide in my conveyor-conduit for an initial soaking of the process material in the miscella and an initial settling and adding to said moving column of process material of fines produced in the preparation of said material.

Referring now to these drawings, which are illustrative of a preferred embodiment of mechanical apparatus for carrying out my invention, 10 indicates a conventional vertically-disposed extraction column which is preferably of the type more fully shown and described in my Patent #2,203,666, dated June 11, 1940, though any suitable type of extraction column or apparatus may be employed. One end, and, as shown, the lower end of the column 10 is provided with a solvent inlet 11 having a suitable pump 12 and a solid material discharge 13, which is preferably provided with applicant's conventional plug mechanism, one form of which is illustrated in Fig. 1 of applicant's Patent #2,184,248 and another form of which is illustrated in applicant's Patent #2,203,666, or, if desired, a material outlet such as shown in applicant's Patent #2,206,595, may be applied between the conduit 13 and the actual outlet for the discharge of the treated solids. The opposite end has integrally and initially connected therewith a continuous conveyor-conduit 14 comprising a plurality or series of liquid and vapor-tight continuous conveyor portions or legs 15, 16, 17, 19 and 20. Said conveyor-conduit includes a stationary casing portion 14 and a conveyor member 14ª movable continuously therethrough, and is disposed in a substantially upright position at one side of the extraction column 10 so that said conveyor-conduit is polygonal in outline with downwardly and upwardly conveying legs 16 and 20 connected by upper and lower transverse legs 15, 17 and 19. As shown, said conveyor-conduit 14 of said conduit has its upper transverse leg 15 extending secantially across the top portion of the column 10 to one side of a conventional vertical shaft 10ª. Said transverse leg 15 is inverted and has an elbow 15ª which preferably extends outwardly from said top portion of said column at a substantial incline to a horizontal plane to enable the passage or gravity feeding directly therethrough of miscella produced by the extraction process in the column 10. As illustrated, the portion of the leg 15 that extends within the column 10 has a feed opening 15' enclosed within and leading downwardly directly into said column.

Process material, preferably in flaked form, is fed into said continuous conveyor-conduit 14 through a hopper 20ª connected with the downwardly-extending leg 20 and when the conveyor 14ª, which is preferably of the drag-chain open-prong type shown in Fig. 4, is driven through the conduit or casing 14, as, for example, by the drive wheel 14ᵇ on a drive shaft S rotated in conventional manner from any suitable source of power, not shown, said process material will substantially fill the conveyor-conduit and form a moving columnar body therein which is continuously conveyed through the legs 20, 17, 16 and 15 of the conveyor conduit and thence fed directly to the extraction column 10. The transverse leg 15 of this conveyor 10 functions as a feed mechanism for the extractor 10 and eliminates the usual feed screw or other feed mechanism.

The connection between said conveyor-conduit elbow 15ª and said column 10 is liquid and vapor-tight and consequently the miscella product of the extraction process within the column 10 will when it reaches the elbow 15ª flow downwardly by gravity into and through said elbow 15ª of the inclined leg 15 and thence downwardly through the upwardly-conveying leg 16 of the said conduit 14 in a counter-current movement with process material being conveyed by the conveyor-conduit 14 to the said column 10, and during such counter-current movement said miscella will percolate through the columnar body of flaked solid process material in said upwardly-disposed conveying leg 16 and thence through a part of the transverse conveyor leg 17 to connection at 18' with the bottom or settling end of a settling tank 18 connected with said transverse leg 17. The connection at 18' is of larger or increased area relatively to the discharge section 15ª and conduit legs 16 and 17, thus reducing the velocity of the outgoing miscella. After a settling action in the tank 18 the miscella will overflow and be discharged through pipe 22, but the miscella in said conveyor-conduit will also flow upwardly in the leg 20 to a liquid level 23 to provide an initial soaking portion or section as hereinafter more particularly specified.

The material in the leg portion 16 and 17 between the miscella inlet and the connection with the settling tank 18 will function as a filter for the miscella, and the process material therein will be loaded with fines, particularly in the interstices of such flaked material, and such loaded fines so filtered out will thus be fed with the process material being conveyed thereby into the extraction column.

In my Patent #2,370,138 I have shown and described a method of moving the miscella in counter-current by draining and discharging miscella from a filtering leg through screens or perforated openings in the sides of the continuous conveyor-conduit, and referring to prior-art settling of the miscella says:

"When settling of the miscella is used, difficulty is encountered in handling the solids which constitute the settlings and in recovering the oil and solvent with which the settlings are soaked."

By my present invention, however, I have improved the process of settling miscella by providing in my continuous conveyor-conduit 14 a settling section or portion 17ª in the transverse leg 17 and producing a counter-current movement or flow of the miscella through the bottom or settling end of the settling tank 18 and provided with the overflow 22. Preferably, in order to overcome and compensate for friction encountered in the passage of the miscella through the process material in the filtering portion 16, I provide space in the upwardly conveying leg 16 for a hydrostatic head 21 which will vary in accordance with the type of material being processed and the viscosity of the miscella.

As illustrated, said settling tank 18 and transverse-conveyor leg 17 are directly connected at 18' between the filter-leg 16 and the downwardly-conveying leg 20 which, as aforesaid, functions as an initial material soaking portion. As shown, the downwardly-extending conveyor leg 20 is inclined and has a material inlet 20ª to which the hopper 20ᵇ is connected and the liquid level 22ª in the tank 18 preferably extends to a position below the feed spout 20ª of the feed hopper 20ᵇ. The liquid miscella, after being filtered in the filter portion 16—17, will flow upwardly into and through said settling tank and to an overflow pipe or conduit 22 connected to the top of said settling tank 18 at said liquid level 22ª.

The liquid miscella thus initially filtered and clarified in the filter-section of the legs 16 and 17 and the tank 18 will provide a settling for the fines eventually carried over in the miscella and such miscella will consequently be further clarified, and furthermore the fines settled out from the miscella by said tank 18 will be automatically fed by gravity and introduced into the moving column of flaked process material which will thus be initially enriched by settled fines before being subsequently enriched by fines filtered out in the percolating or filtering section of the conveyor-conduit in the legs 16 and 17. Thereafter such enriched process material is, as aforesaid, in continuous operation fed to the extractor 10.

As the settlings or fines in the bottom of the settling tank in my improved device are automatically fed and introduced by gravity, as aforesaid, into the process material in the conveyor-conduit, the flaked material is not only doubly enriched but any difficult separate handling of the solid fines constituting such settlings will be avoided.

Liquid miscella passing upwardly through the tank 18 may be decanted through the overflow pipe or conduit 22 in such clarified condition that when operating with certain materials no further settling will be necessary though it is understood, of course, that with still other materials additional clarification of the miscella may be desirable.

As the flaked material enriched by such settlings is directly and continuously fed through the feeding, filtering and settling conduit in the extraction column, the extraction process per se is improved, and the filtering and settling is continuous and integral with said extraction process in the column, and in the embodiment hereby disclosed, the apparatus is organized, connected and arranged as a single unitary process and apparatus.

The dry material from the hopper 20$^b$ passes into the leg 20 through the inlet 20$^a$ and passes below the liquid level 23 therein, whereupon the material will become soaked with the liquid. This soaking occurs in two ways, material above the liquid in the leg will absorb by capillary attraction part of the liquid and will then be dragged below the liquid level 23 by action of the conveyor where the soaking is completed.

To fill the voids left by this soaking, the liquid in the leg 20 is continuously raised by the hydrostatic head existing in the tank 18. Thus a slight counter-current movement occurs in the leg 20.

Some of the fines of the solid material produced in the preparing operation and being fed through the leg 20 will float upwardly into the settling tank 18 through the opening 18', but these fines will be immediately settled back into the columnar body of the material moving through the conveyor-conduit, and all the fines so settled, together with those from the miscella passing through the tank inlet 13' will be incorporated in the moving columnar body of material being fed to the extractor.

The quantity or amount of fines floating into the settling tank 18 will depend upon the velocity of the liquid passing through the opening or connection 18' and the velocity of the moving column of material produced by the speed of the conveyor. The desired velocity will depend upon the type of material being treated.

The tank 18 will have a capacity in proportionate relationship to the time allowed for the settling, and if desired a plurality of such connected settling tanks may be used to suit the settling time required for the miscella of a given material.

In the vertical column type of extractors, the concentration of oil in the miscella at the outlet at the top of the extractor is limited in view of the fact that a miscella-concentration that is too rich in oil will, because of its higher density in respect to the solvent, have a tendency to flow to the bottom of the extractor. This is due to the fact that when flaked material is fed at the top of the column in counter-current with a solvent, the free oil contained in the flakes is rapidly dissolved. By "free oil" we mean the oil that is liberated mechanically during the flaking of the material by the action of the flaking rollers. The unbroken oil cells are then extracted by diffusion in the lower part of the vertical column. This condition in an extractor is harmful or detrimental to a complete extraction of the oil in the material because the pure solvent entering the bottom of the extractor is contaminated by the rich miscella flowing downward so that the diffusion action in the extractor is highly impaired.

In my invention, a washing action of the free oil takes place in the conveyor-conduit 14 and particularly in the feeder and filtering portions thereof so that the concentration of the miscella at the top of the extraction column is reduced far below the danger point, and the required diffusion action in said column takes place under the best conditions.

The operation of the process and apparatus will be obvious from the drawings and the above specification.

While I have shown and described only a single settling tank connected to a relatively short leg 17 of the conveyor-conduit, it will be obvious that, if desired, a plurality or series of such tanks may be similarly connected with a longer leg and that such tanks may be successively connected at their upper ends by pipes such as 22.

It may be desirable in some cases to pass through the conveyor-conduit to the extractor fines that have been settled in a separate tank or tanks, and for this purpose I provide at the elbow 15$^a$ an inlet-conduit 24 through which such fines may be introduced by conventional means.

It will be understood that the process material of the process hereinabove specified will comprise oil-bearing vegetable seeds, grains, nuts and like materials, such as cotton-seed, soya beans, tung nuts, linseed, castor beans, copra, bone meal, meat scraps and the like, in which as stated in my Patent No. 2,112,805 the oil constituents are contained in cells and the cells are surrounded by membranes or tissues, and also that the solvent will be of a specific weight which is lighter than the specific weight of the material, and in the embodiment shown I preferably employ gasoline as the solvent.

Having described my invention, I claim:

1. Apparatus for counter-current solvent-extraction of oil from oil-bearing materials comprising, in combination, a process-material-conduit having sections extending downwardly and upwardly, a conveyor continuously moving in said conduit, a feed inlet at one portion of said conduit for feeding solid process material thereto, means for feeding miscella containing fines to and passing same through said conveyor-conduit in counter-current with said solid process material to a liquid level below said feed inlet for solid material, and a settling tank having at its settling end a miscella-inlet connection with said conveyor-conduit below said liquid level to provide a loading of said material with settled fines, and said settling tank also being provided with a miscella outlet disposed above said settling end thereof to permit decanting of clarified miscella therefrom.

2. Apparatus for counter-current solvent extraction of oil from oil-bearing materials having oil constituents contained in cells and the cells surrounded by membraneous tissue, comprising, in combination, an extraction column, a feed inlet for solid material and an outlet for miscella at one end of said column, a solvent inlet and discharge outlet means for extracted solid material connected with the opposite end thereof and a conveyor feed conduit connected with the feed inlet for solid material and with said miscella outlet, said process material conduit having sections extending downwardly and upwardly, a conveyor continuously moving in said conduit, a feed hopper at one end of said conduit for feeding solid process material thereto, said conduit being arranged to cause the miscella received from said extraction column to reach liquid level below the solid material inlet of said conduit, and a settling tank having at its settling end a miscella inlet connection with said conveyor conduit below said liquid level to provide a loading of said miscella with settled fines, said settling tank also being provided with a miscella outlet disposed above its settling end to permit decanting of clarified miscella therefrom.

3. The steps in the process of extraction of oil-bearing materials having oil constituents contained in cells and the cells surrounded by membraneous tissues consisting in continuously passing a given process material through an extractor-feeding operation, continuously subjecting the solid process-material thus passed through said feeding operation to extraction with a solvent in which the process material and fines thereof will sink, the production during such extraction of miscella embodying fines of said process material, continuously passing in a wetting operation miscella produced in said extraction through the solid process material being passed in the said feeding operation, subjecting said miscella to a settling operation in continuation with said wetting operation to clarify the miscella, and adding the settled fines to said process material during said feeding operation thereof to load said process material with such fines.

4. The steps in the process of extraction of oil-bearing materials having oil constituents contained in cells and the cells surrounded by membraneous tissues consisting in continuously passing a given process-material through an extractor-feeding operation, continuously subjecting the solid process-material thus passed in the said feeding operation to counter-current extraction with a solvent in which the process material and fines thereof will sink the production during such extraction of miscella embodying fines of said process-material, passing in counter-current with the solid process material being passed through said feeding operation the miscella so produced from said extraction operation in a soaking and filtering operation to and below a predetermined liquid level, subjecting said miscella to a settling operation below said predetermined liquid level and as a continuation of said soaking and filtering operation, and adding the fines settled out in said settling operation to said process material being passed through said feeding operation.

MICHELE BONOTTO.

REFERENCES CITED

The following references are of record in the file of this patent:

UNITED STATES PATENTS

| Number | Name | Date |
|---|---|---|
| 913,751 | Mills | Mar. 2, 1909 |
| 2,183,837 | Hamilton | Dec. 19, 1939 |
| 2,206,595 | Bonotto | July 2, 1940 |
| 2,416,196 | Mortenson | Feb. 18, 1947 |

FOREIGN PATENTS

| Number | Country | Date |
|---|---|---|
| 119,134 | Germany | Apr. 27, 1899 |